United States Patent [19]

Dayton et al.

[11] Patent Number: 4,799,254
[45] Date of Patent: Jan. 17, 1989

[54] PORTABLE COMMUNICATION TERMINAL FOR REMOTE DATABASE QUERY

[75] Inventors: Douglas C. Dayton, Harvard, Mass.; Richard Bergeron, Londonderry, N.H.; Donald R. Shriner, Harvard, Mass.

[73] Assignee: Wang Laboratories, Inc., Lowell, Mass.

[21] Appl. No.: 880,438

[22] Filed: Jun. 30, 1986

[51] Int. Cl.[4] .......................................... H04M 11/00
[52] U.S. Cl. ........................................ 379/97; 379/96
[58] Field of Search ................. 179/2 A, 2 C, 2 DP; 379/93, 94, 95, 96, 97, 98, 52, 99; 340/825.44

[56] References Cited

U.S. PATENT DOCUMENTS

| | | | |
|---|---|---|---|
| 3,976,840 | 8/1976 | Cleveland et al. | 179/2 DP |
| 4,007,443 | 2/1977 | Bromberg et al. | 179/2 DP X |
| 4,115,870 | 9/1978 | Lowell | 179/2 DP X |
| 4,117,542 | 9/1978 | Klausner et al. | 179/90 BD |
| 4,201,887 | 5/1980 | Burns | 179/2 DP |
| 4,268,721 | 5/1981 | Nielson et al. | 179/2 C |
| 4,307,266 | 12/1981 | Messina | 179/2 DP |
| 4,471,165 | 9/1984 | DeFino et al. | 179/2 A |
| 4,503,288 | 3/1985 | Kessler | 179/2 DP |
| 4,525,624 | 6/1985 | Pontefract | 179/2 DP X |
| 4,608,457 | 8/1986 | Fowler et al. | 179/2 A |
| 4,630,108 | 12/1986 | Gomersall . | |
| 4,677,659 | 6/1987 | Dargan | 379/97 |
| 4,688,035 | 8/1987 | Gray et al. | 340/825.44 |

FOREIGN PATENT DOCUMENTS

WO/81/023-
73   8/1981  PCT Int'l Appl. .................. 379/99

OTHER PUBLICATIONS

"Lifestyle Personal Communicator", AudioBionics, Mar. 1985.
"Communications Device", Hearing Instruments, vol. 36, No. 1, Jan. 1985.
Glasgal Communications, Inc., "Data Communications Equipment and Supplies, Summer Catalog 1985", Aug. 1985, p. 146.

Primary Examiner—Keith E. George
Attorney, Agent, or Firm—Michael H. Shanahan; Kenneth L. Milik

[57] ABSTRACT

A portable terminal suitable for brief queries to a central database can be employed with any available telephone for communication over the public telephone network. Message characters are entered through the keyboard, stored in memory in digitally coded form, and displayed in a display window. A speaker is acoustically coupled to the telephone mouthpiece. After dial-up connection to a host, a stored message is recalled and transmitted; the stored digitally coded data is converted to a code employing unique sequential pairs of standard DTMF tones, provided by a tone generator to the speaker. The message can be compared off-line, stored, and edited using special function keys including insert and delete. Telephone numbers can be dialed through the terminal keyboard, and are transmitted in standard DTMF coding. Telephone numbers can be stored as messages, or can be embedded in text messages. Host response is transmitted in audio coding (recorded or synthetic speech) to the telephone earpiece, or in DTMF coding to a microphone connected to the earpiece; DTMF coded response data is converted in the terminal to digitally coded form for storage.

1 Claim, 8 Drawing Sheets

| ASCII | DTMF | ASCII | DTMF | ASCII | DTMF |
|---|---|---|---|---|---|
|   |     | A | 41 | a | 61 |
| " | 22 | B | 42 | b | 62 |
| # | 23 | C | 43 | c | 63 |
| $ | 24 | D | 44 | d | 64 |
| % | 25 | E | 45 | e | 65 |
|   |    | F | 46 | f | 66 |
| ' | 27 | G | 47 | g | 67 |
| ( | 28 | H | 48 | h | 68 |
| ) | 29 | I | 49 | i | 69 |
| * | 2A | J | 4A | j | 6A |
| + | 2B | K | 4B | k | 6B |
| , | 2C | L | 4C | l | 6C |
| - | 2D | M | 4D | m | 6D |
| . | 2* | N | 4* | n | 6* |
| / | 2# | O | 4# | o | 6# |
| 0 | 30 | P | 50 | p | 70 |
| 1 | 31 | Q | 51 | q | 71 |
| 2 | 32 | R | 52 | r | 72 |
| 3 | 33 | S | 53 | s | 73 |
| 4 | 34 | T | 54 | t | 74 |
| 5 | 35 | U | 55 | u | 75 |
| 6 | 36 | V | 56 | v | 76 |
| 7 | 37 | W | 57 | w | 77 |
| 8 | 38 | X | 58 | x | 78 |
| 9 | 39 | Y | 59 | y | 79 |
| : | 3A | Z | 5A | z | 7A |
| ; | 3B | [ | 5B | { | 7B |
| < | 3C | \ | 5C | \| | 7C |
| = | 3D | ] | 5D | } | 7D |
| > | 3* | ↑ | 5* | ~ | 7* |
| ? | 3# | ← | 5# | DEL | 7# |
| @ | 40 |   | 60 |   |    |

FIG. 11

TOUCH TONE FREQUENCY ASSIGNMENTS

|     | 1209 | 1336 | 1477 | 1633 |
|---|---|---|---|---|
| 697 | 1 | 2 | 3 | A |
| 770 | 4 | 5 | 6 | B |
| 852 | 7 | 8 | 9 | C |
| 941 | * | 0 | # | D |

FIG. 12

PORTABLE COMMUNICATION TERMINAL FOR REMOTE DATABASE QUERY

This invention relates to the transmission of data over a telephone line to and from a host computer, using a protocol based on the standard DTMF tones.

It is often desired to be able to query a database, maintained in a large central computer, from a distant location. Such database use is frequently accomplished by means of a terminal connected through a dedicated network to the computer. However, such use requires that the terminal and network be available physically for the user. When the user is not at a fixed location, as may occur, for example, with salesmen or maintenance staff who need to query a home database concerning prices, availability of stock, or spare parts, it would be convenient to be able to make the database query and to receive data in reply over a standard telephone line, which is available almost anywhere.

The standard telephone is not equipped with a full alphanumeric keyboard suitable for convenient transmission of alphanumeric data, so that a terminal having such a keyboard must be employed if alphanumeric datat is to be transmitted, as is the case with most practical database queries. Various portable terminals have been designed to be used with or in place of a standard telephone handset, to provide full alphanumeric keyboard. However, most such terminals have depended on the inclusion of a modem, to convert the keyboard input to an audio form suitable for transmission over the telephone line.

There are various disadvantages attached to portable terminals including modems. For one thing, use of a modem requires a very good coupling to the telephone line, including good acoustical isolation; this requirement limits the locations in which a modem equipped terminal can be used. For example, it is difficult to provide a portable terminal using a modem that can be easily and effectively attached to a public telephone in a telephone booth for reliable transmission of data. Furthermore, modems are comparatively expensive components. For a class of simple, brief database queries in which the amount of data to be transmitted in both directions is relatively small, so that transmission speed is not critical, an inexpensive, light weight portable terminal, not employing a modem and not requiring high quality coupling to the telephone line, would be extremely practical.

Known portable terminals have had other disadvantages. Frequently such terminals have provided keys and modem but no display, so that the operator has had no chance to check his transmission for accuracy. Further, such terminals have generally not provided storage; therefore, the operator has had to key in each transmission, and the message is transmitted at the rate of the operator's actuation of the keys. Additionally, if the message for transmission is not stored, no corrections can be made on it before it is sent; if an error is transmitted, the operator must recognize the error and send a correction. All this has made the use of such terminals slow, difficult and inconvenient.

It is therefore an object of the present invention to provide a portable terminal suitable for brief queries to a central database, which is inexpensive, and which can be employed with any available telephone for communication over the public telephone network, not requiring special conditions or high quality acoustic coupling to the telephone. It is a further object of the present invention to provide such a terminal that permits the user to compose a query or other message off-line, to store the message, to perform editing functions on the message, and thereafter to transmit the message over a standard dial-up telephone line to a suitable host computer, at a speed greater than could be achieved if the message characters were transmitted one by one upon entry, at the speed at which the user can actuate the keyboard.

It is yet another object of the present invention to provide such a terminal that can transmit reply data in voice form from the host computer to the terminal user. It is also an object of the present invention to provide such a terminal that can receive data from the host computer for storage in the terminal.

In preferred embodiments of the invention, a portable communications terminal comprises a keyboard providing alphanumeric character keys for entering alphanumeric input signals corresponding to alphanumeric characters, and a Store key and a Send key for entering corresponding input signals; storage means for storing digitally coded representations of characters corresponding to the alphanumeric character key input signals; a DTMF tone generator; a speaker connected to the generator; and controller means. The controller means is connected to the keyboard, the storage means, and the tone generator, and is responsive to an input signal corresponding to actuation of the Store key for storing digitally coded representations of alphanumeric characters corresponding to subsequent alphanumeric input signals in the storage means as a message string.

The controller means is thereafter responsive to an input signal corresponding to actuation of the Send key for accessing the stored message string, and is responsive to each successively accessed digitally coded representation, for causing the generator to generate two successive DTMF tones comprising a sequential pair uniquely corresponding to the corresponding alphanumeric character, and for causing the speaker to transmit the sequential pair of tones.

In preferred embodiments, the controller means in response to actuation of the Send key first derives a count of characters represented in the stored message string, and thereafter causes the generator means to generate tone pairs uniquely corresponding to a start character and to a count header representing the derived character count.

In preferred embodiments, the terminal further comprises display means having a plurality of character display positions including an input window position; the controller means is connected to the display means and, responsive to actuation of the alphanumeric character keys, controlling the display to display representations of a corresponding plurality of most recently entered characters, the representation of the most recently entered character being displayed in the display window.

In a preferred embodiment, the terminal keyboard further provides a message label attach key and a message end key for entering corresponding input signals; the controller means is responsive to actuation of the Store key for causing storage of digitally coded representations of a second plurality of entered characters as a message label. The controller means is responsive to actuation of the message label attach key for causing storage of digitally coded representations of subsequently entered characters as message text, and is responsive to actuation of the message end key for causing storage of a digitally coded message end character. The controller means responds to actuation of said Send key by deriving a count of characters represented in the stored message text between the message label attach character and said message end character, and thereafter causes the generator means to generate tone pairs uniquely corresponding to a start character and to a count header representing the derived character count.

The terminal keyboard further provides a Recall key for entering a corresponding input signal; the controller means is responsive to actuation of the Recall key followed by the actuation of up to the second plurality of alphanumeric character keys comprising a search argument, for accessing the storage means and conducting a match search of all said stored message labels in the storage means, and for causing the display means to display the first stored message label which matches the search argument.

The terminal keyboard further provides up and down scroll keys, responsive to which sequentially stored message labels are displayed, and left and right scroll keys for causing left or right shift of characters of the stored message text with respect to the display character positions in the display. The keyboard further provides an Insert key and a Delete key for performing editing operations on a stored message text.

The terminal provides a Dialer mode key: after actuation of this key, the terminal responds to subsequent actuation of an alphanumeric key representing a dialable character by causing the generator means to generate a standard Bell System DTMF tone corresponding to the entered character in the Bell System protocol, the generated tone being transmitted by said speaker.

In preferred embodiments, the terminal keyboard further comprises a Calculator mode key and a plurality of mathematical function command keys; the terminal responds to actuation of the Calculator mode key by thereafter responding to actuation of alphanumeric character keys representing mathematical digits and mathematical function command keys by performing indicated mathematical operations upon indicated mathematical digits, and displaying representations of characters corresponding to the results of the mathematical operations.

The speaker is adapted for acoustical coupling to the mouthpiece of a telephone handset. A communications system comprises the terminal, a telephone handset acoustically coupled to the speaker, and a host computer connected to the telephone handset through a dial-up telephone line. The host computer is provided with stored signals representing the correspondence between a digital representation of the alphanumeric characters and the unique DTMF tone pairs used by the terminal, and decodes received DTMF tone pairs from the terminal. The host computer responds to the decoded message text by transmitting data to the telephone handset in audio coding.

In a further improvement, the terminal further has an input port, to which a computer can be directly connected, permitting direct loading of digitally coded data from the computer to the terminal's storage.

Other objects, features and advantages will appear from the following description of a preferred embodiment of the invention, together with the drawing, in which.

Figure 1:
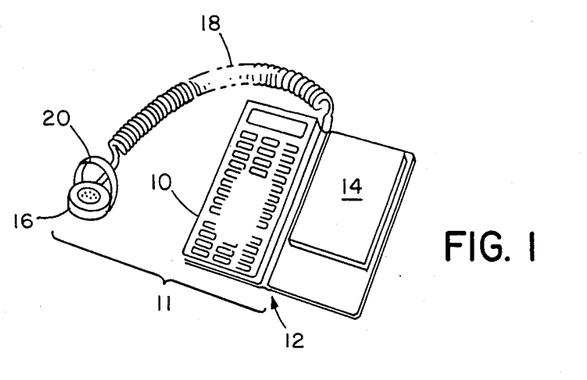
FIG. 1 shows the portable terminal of the invention.
Figures 2, 3:
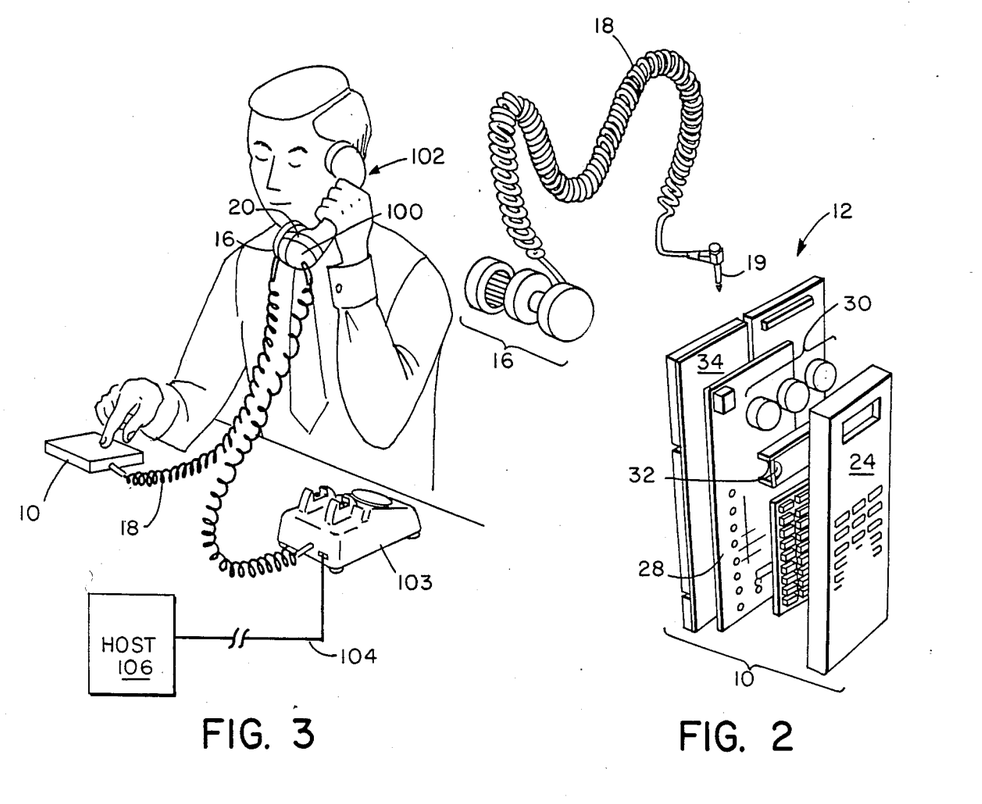
FIG. 2 is an exploded view of the elements of FIG. 1.
FIG. 3 shows the portable terminal in data transmission position, connected with a remote host computer through a telephone handset.

Referring now to the drawing, and in particular to FIG. 1, in a preferred embodiment the terminal 11 of the invention is carried in a carrying case 12 which provides two flaps hinged together; a first flap carries the housing 10 of the terminal of the invention, while the second flap desirably provides a replaceable notebook 14. The terminal 11 of the invention comprises the housing 10 and its contents, together with a speaker 16 which is connected to the housing by a coil cord 18 and jack 19 (FIG. 2). Speaker 16 is attachable to the mouthpiece of a telephone handset by means of a strap 20 or other suitable attachment means.

Referring to FIG. 2, in preferred embodiments the terminal housing 10 provides a top plastic cover 24 and a bottom cover 34 which is secured to the carrying case 12. Housing 10 contains a keyswitch array 26 of which the keys protrude through cover 24, a circuit board 28 carrying switch array 26 on one side and suitable electronic components on the other, a power supply 30, and a liquid crystal display 32 mounted on board 28. Covers 24 and 34 are secured together to protect the contents and to comprise housing 10.

Display 32 is desirably a twisted nematic liquid crystal display, providing for the display of dot matrix characters in a single line, comprising eight character positions or cells. Graphic prompts (icons) are desirably displayed adjacent to the character line to assist the operator. Such prompts indicate, for example, that the data dialer is in Calculator or Dialer mode (to be described), that the memory is full, that the voltage of power supply 30 is low, that the operator has made an erroneous entry, or the like.

Figure 4:
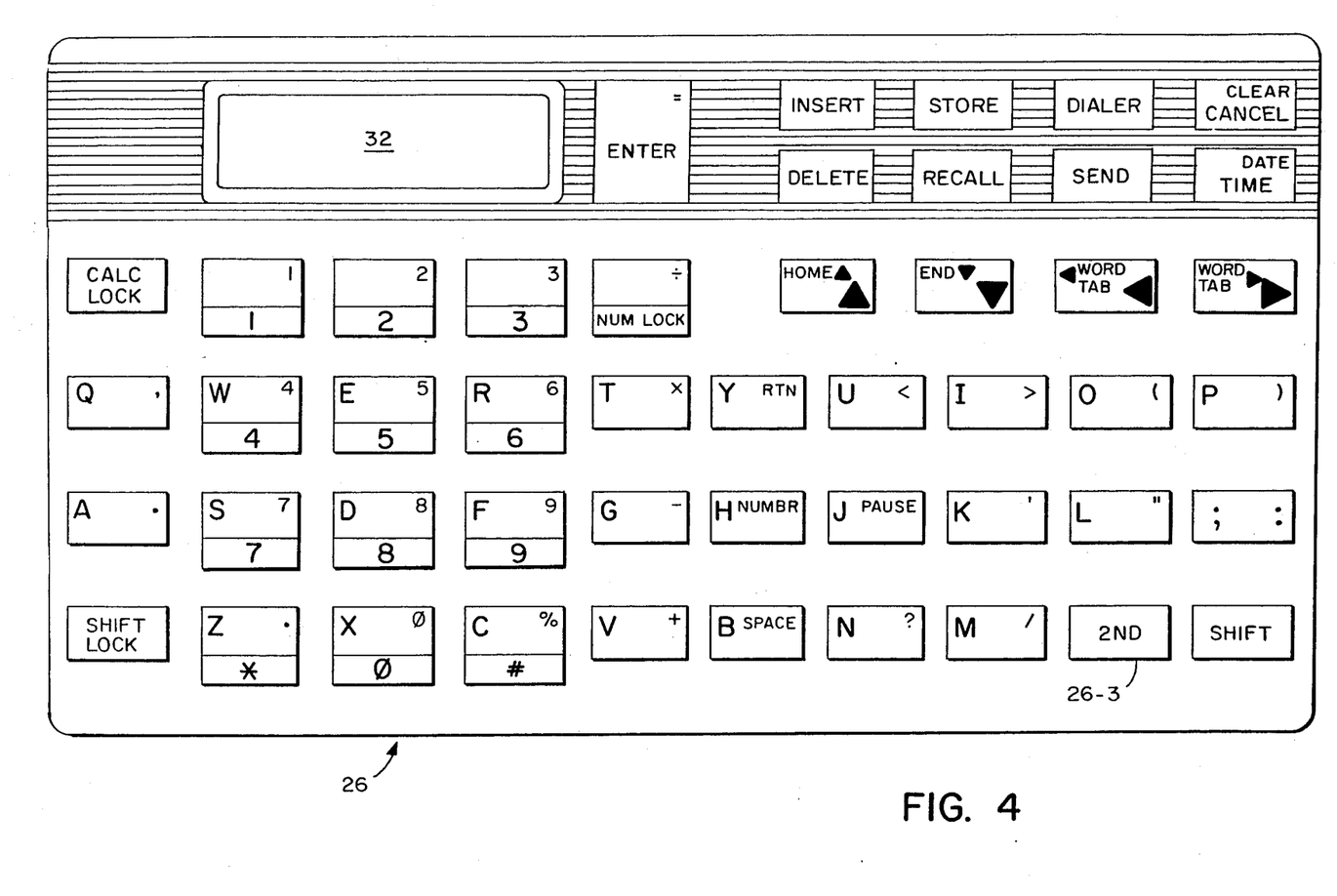
FIG. 4 shows the keyboard layout of the portable terminal.
Figure 5:
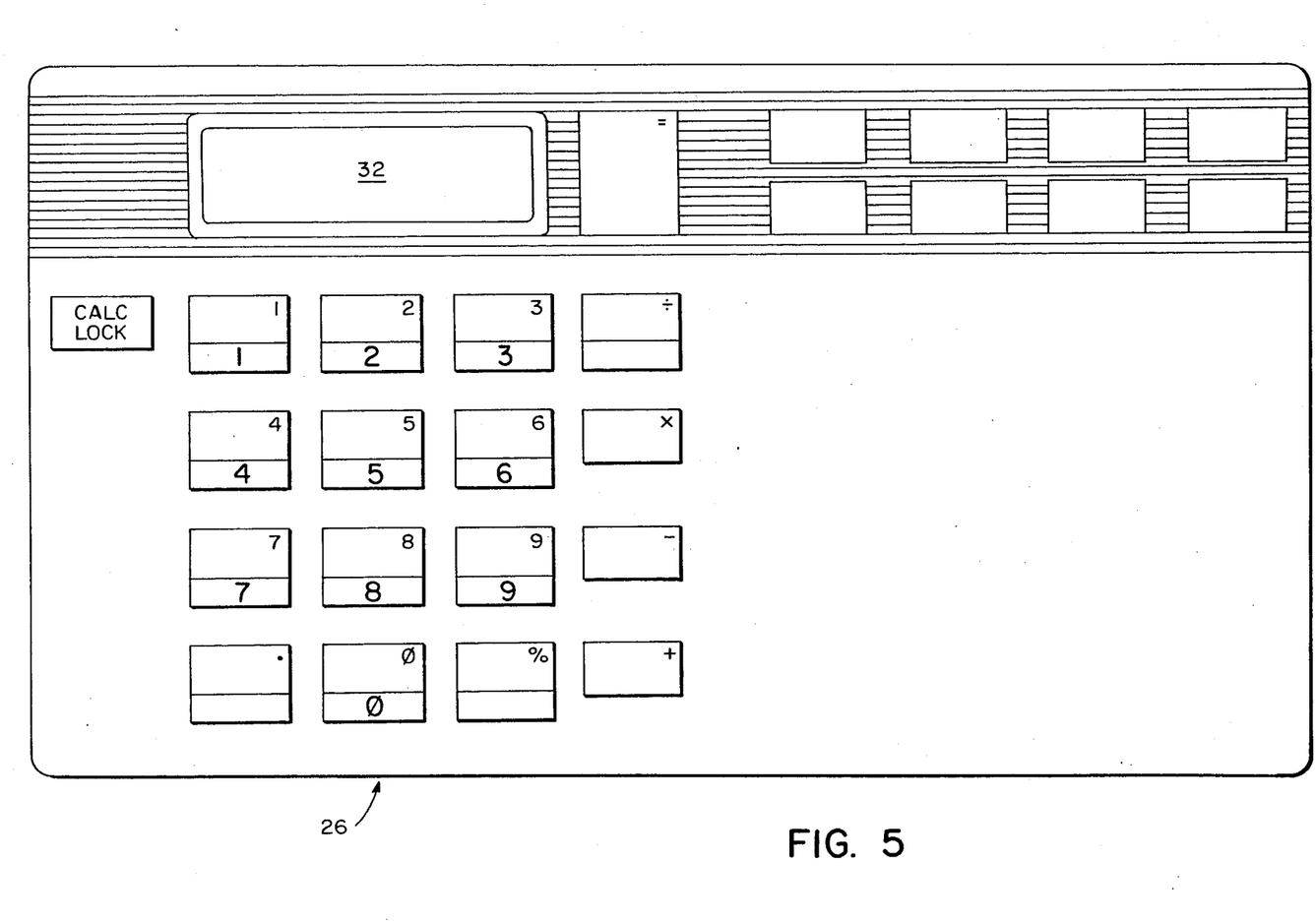
FIGS. 5, 6 and 7 show particular portions of the keyboard that are active in three different modes of operation of the portable terminal.
Figure 6:
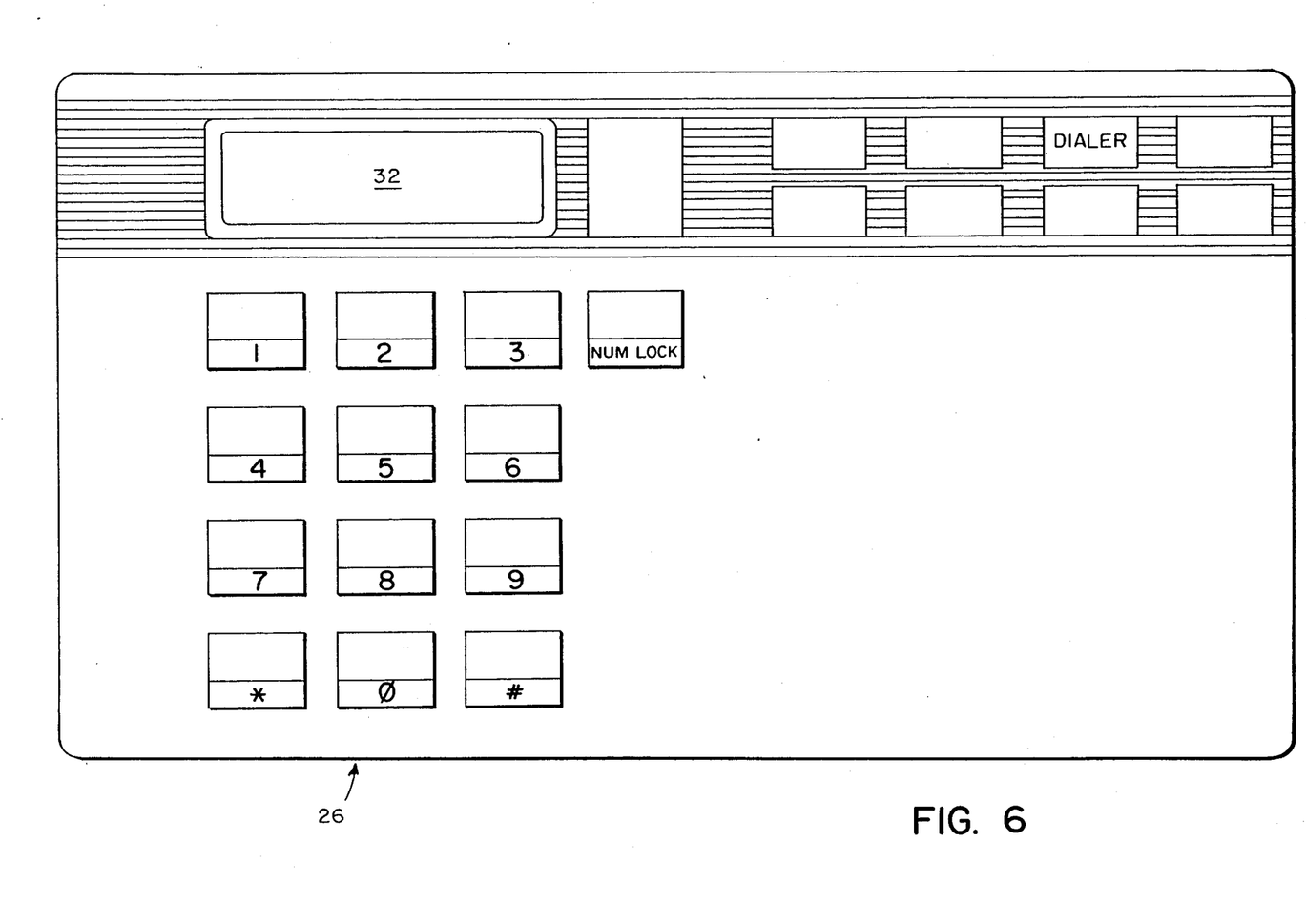
Figure 7:
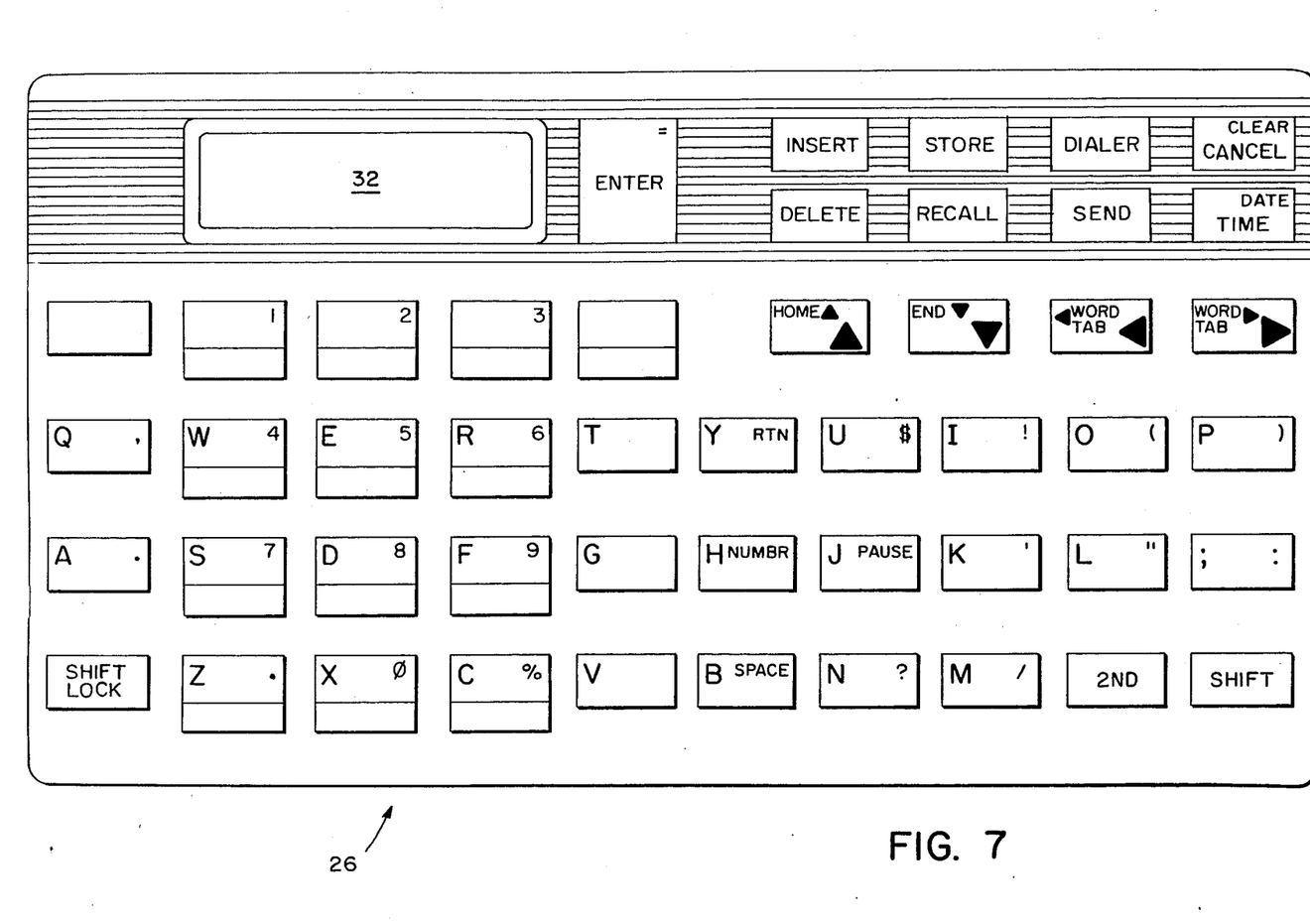

A preferred layout of keyboard 26 is shown in FIG. 4. Several of the keys have more than one function depending on the mode in which the data terminal is operating. For clarity, FIGS. 5, 6 and 7 show the keys of keyboard 26 as used in each of Dialer, Calculator and Edit modes. Desirably, the alphanumeric keys of keyboard 26 are disposed in a standard typewriter (QWERTY) arrangement. The specific keys of keyboard 26 and their functions in the three operating modes will be described in what follows.

Figure 8:
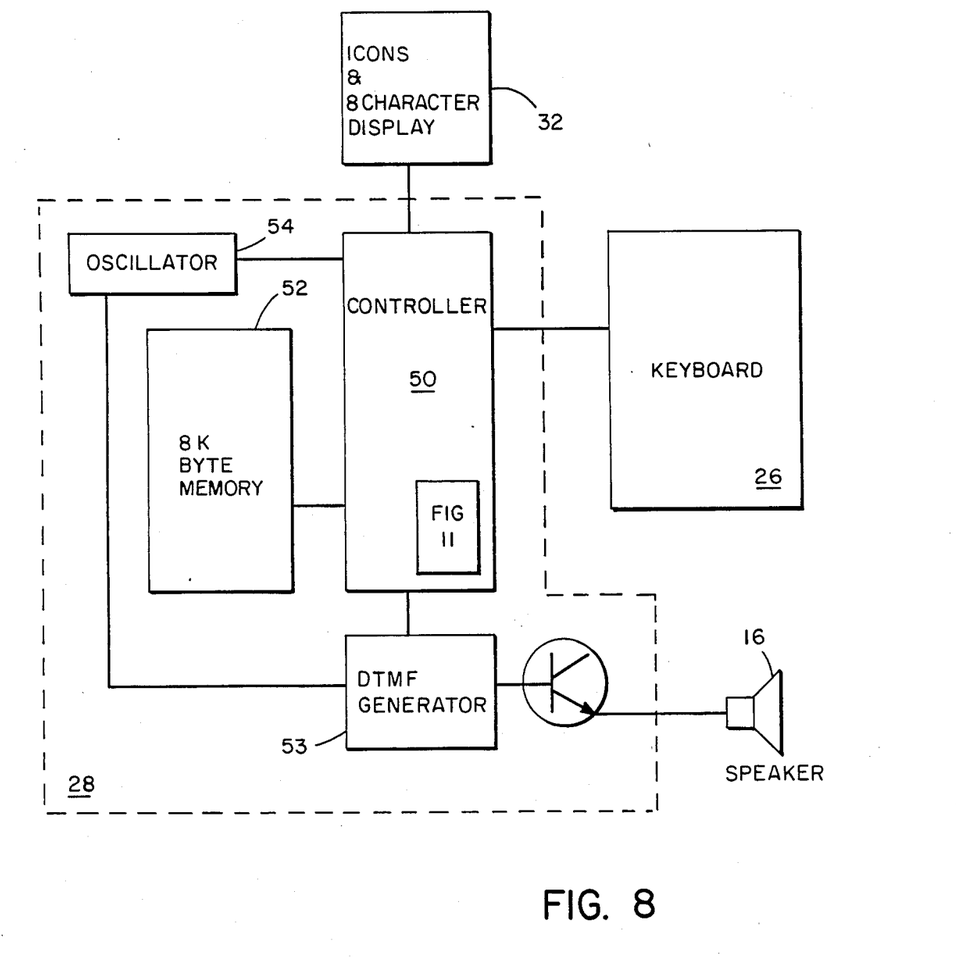
FIG. 8 is a schematic showing of certain elements of the portable terminal.

Referring now to FIG. 8, display 32, keyboard 26 and speaker 16 are connected to the electronic elements provided on printed circuit board 28, which comprise a memory or storage 52, an oscillator 54, a controller 50, and a DTMF tone generator 53.

Desirably memory 52 comprises 8K bytes of storage, which is non-volatile, that is, powered at all times by a dedicated portion of power supply 30 or otherwise. The layout of memory 52 will be described in more detail below. Oscillator 54 functions as the clock for controller 50, and additionally is required in the production of the DTMF tones by generator 53, in a manner well understood in the communications art. Controller 50 desirably comprises a microprocessor and appropriate stored instructions such that controller 50 can carry out the functions described herein; alternatively, controller 50 may be hardwired. Further, there is provided, either as part of the ROM in controller 50 or otherwise, stored signals representing the conversion table of FIG. 11, to be described below.

Figure 12:
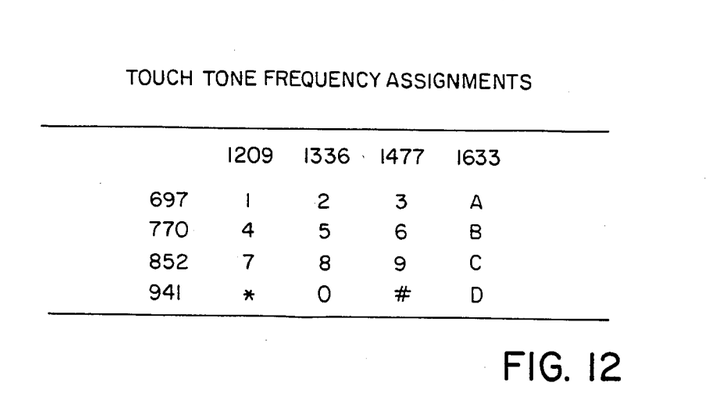
FIG. 12 displays the freqency combinations of the standard Bell System DTMF tones.

As is well known in the communications art, each "DTMF" (dual tone multifrequency) tone, as defined by the Bell System, consists of two sinusoidal signals (transmitted simultaneously). One signal is selected from a group of four high frequencies, and one from a group of four low frequencies. The frequencies are required to be within 1.5 percent of their nominal values and 1.2 percent accuracy is preferred. The minimum duration of a two-frequency signal is 50 milliseconds, and the minimum intersignal time is 45 milliseconds; thus the minimum cycle time is about one digit per 100 milliseconds. Referring now to FIG. 12, the numbers from 0 to 9, the letters ABCD, and the symbols * and #, are represented in the Bell System DTMF protocol by pairs of simultaneously transmitted signals of the indicated frequencies. The values of FIG. 12 are the standard DTMF tones used by the telephone system. Generator 53 produces these tones under the control of controller 50.

Controller 50, in response to input from keyboard 26, controls the operation of memory 52, oscillator 54, generator 53, and display 32.

Characters are entered by actuating alphanumeric character keys on keyboard 26. A digitally coded representation of the entered character is stored in memory 52 under the control of controller 50, and a visible representation of the character is displayed. The right most cell (character position) of the eight-character portion of display 32 is the "input window", in which a representation of each character appears as the character key is actuated on keyboard 26. As controlled by controller 50, representations of characters previously entered move to the left cell by cell as new characters are successively entered and appear in the input window. Characters more than seven positions to the left of the input window are not displayed (but are stored in memory 52). The eight character display 32 is thus in effect an eight character window in memory 52.

Under the control of controller 50, the terminal of the invention can operate in three modes.

In all modes of operation, key 26-3 (2nd) causes the second (upper case) value of the next actuated key to be entered into system, in a manner well understood in the art. An icon on display 32 indicates when the 2nd function mode is active.

In a first or Calculator mode (FIG. 5), the numerical keys of keyboard 26 together with four function keys, the equals key, the percentage key, and the decimal point key, function as the inputs to a standard four-function calculator. The terminal operates in Calculator mode in response to actuation of the CALC/LOCK key. In Calculator mode, the keys are locked to enter numerical data only. When the CALC/LOCK key is pressed a second time, the terminal returns to operation in its previous mode.

In a second or Dialer mode (FIG. 6), the numerical keys of keyboard 26 can be used to cause generation by tone generator 53 and speaker 16 of standard Bell System DTMF tones (pairs of simultaneously transmitted signals) of FIG. 12, which are transmitted directly over the telephone line to which the terminal is connected as the keys are actuated, to dial up a connection. The terminal operates in Dialer mode in response to actuation of the DIALER key. In this mode, the telephone keypad of keyboard 26 functions exactly as though the user were dialing a touchtone telephone. As each number, letter or pound or star key is pressed the standard DTMF protocol tone is generated and is transmitted immediately over the telephone line. When the DIALER key is pressed a second time, the terminal returns to operation in Edit mode.

In the third or Edit mode, several operations are possible. Briefly, the terminal user can store new messages; he can scan the memory in order to select a previously stored message for editing or transmission; he can recall and edit a message; he can delete a message; he can have a stored telephone number automatically dialed; and finally, if a dial-up connection has been made to the host over a telephone line, he can transmit a recalled message to the host. These operations will now be described in more detail.

Figure 9:
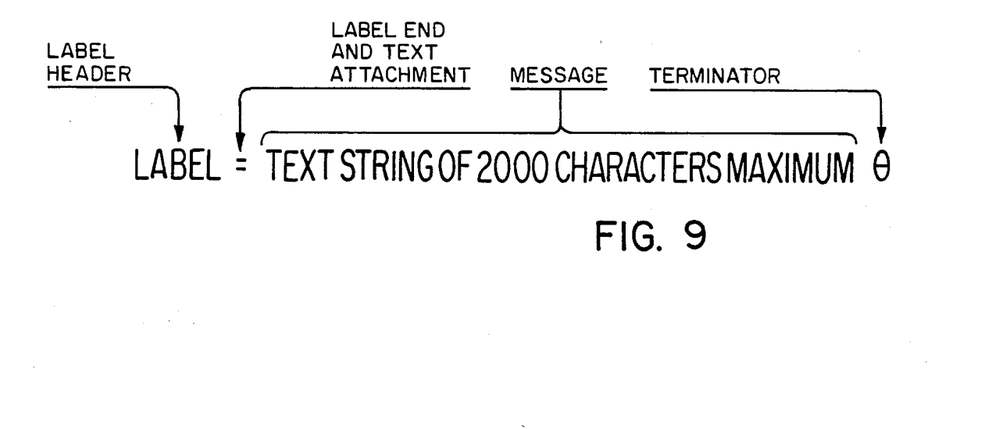
FIG. 9 shows the format of a stored data string.
Figure 10:
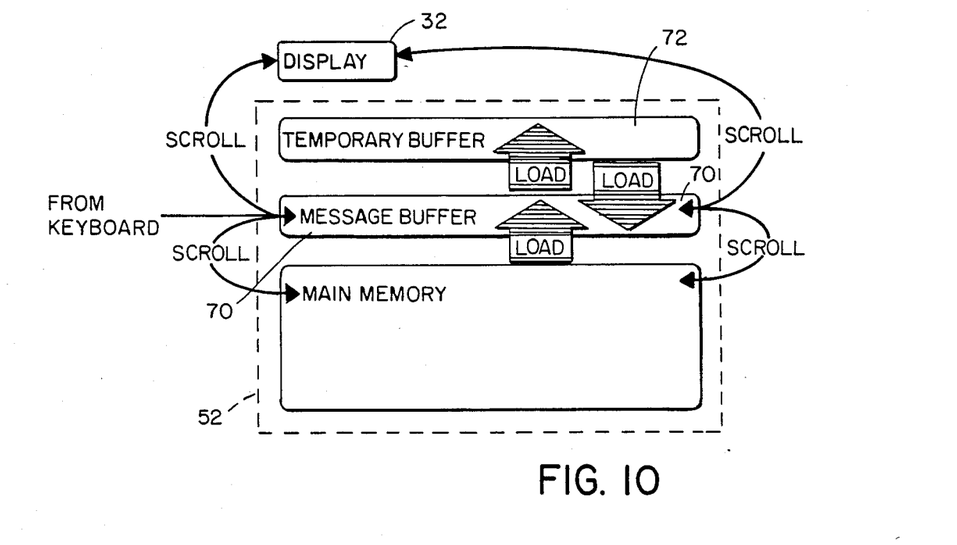
FIG. 10 shows the layout of the memory and its relationship to the display of the portable terminal.

More in detail, to initiate storage of a new message to memory 51, the user presses STORE key on keyboard 26 (FIG. 7). Character strings are entered from keyboard 26 into message buffer 70 (FIG. 10) in the format shown in FIG. 9. In response to actuation of the STORE key, controller 50 clears display 32, and recognizes the next characters entered, up to a limit of seven as the label. Digitally coded representations of the characters of the label are stored in the message buffer, and representations of the characters are displayed. The equals key, actuated by the user, provides a corresponding input which is recognized by controller 50 as terminating the label. A code is stored and the equals character is displayed. Subsequently entered characters are recognized by controller 50 as comprising a message which is identified by the previously entered label. The characters of the message are sequentially displayed, as has been described, and are stored in memory 52. The message text may comprise up to 2000 characters. When the user presses the ENTER key, controller 50 recognizes the end of the message, and stores a non-displayed end-of-message character in the memory. Controller 50 causes the display to become blank, and the STORE operation is complete.

Dialable telephone numbers may be entered and stored, either alone or embedded in the text of other messages, but must be identified by actuation of the NUMBER key before the telephone number digits, and actuation of the ENTER key at the end of the digits. Controller 50 responds to actuation of these keys by storing ASCII codes for left and right arrows at the beginning and end respectively of the telephone number in memory 52. A 1500 msec pause can be inserted by pressing the PAUSE key. An up arrow is displayed, and the ASCII code for this character is stored in memory 51.

While entering a new message, or after a message has been completely entered, the terminal operator can edit the text. To edit text, the operator uses special function keys on keyboard 26 to cause controller 50 to position the text (by shifting the characters of the stored string that are displayed in the display window), and other keys to cause controller 50 to modify the text.

To position the text, controller 50 responds to actuation of either of the Horizontal Scroll keys by shifting the characters displayed on display 32 in the direction indicated by the arrow on the keycap, with respect to the input window. Actuation of either the left or right Word Tab keys (shifted Horizontal Scroll keys) causes controller 50 to search for the next occurrence of a space character to the left or right in the stored text in memory 52, and to shift the displayed text by a word to the left or right of the initially displayed text. Actuation of the HOME key (shifted Scroll Up) causes the first character of the stored string to be shown in the input window, with all remaining characters to the right of it (not displayed). Actuation of the END key (shifted Scroll Down) causes the last character of the string to be displayed in the input window, with all remaining characters to the left of it (seven other characters displayed).

To modify the text, the operator uses the INSERT key to enter characters into the string at the input window. Text to the right of the insert remains undisplayed, while characters to the left of the insert are successively shifted to the left as new characters are inserted. Actuation of the ENTER key completes the insert operation. Actuation of the DELETE key first causes the controller 50 to modify the displayed text by adding a displayed underline to a character intended to be deleted; successive actuations of the DELETE key shift the text and indicate successive characters to be deleted; the ENTER key is used to complete the delete operation. All characters that have been underlined are deleted upon actuation of the ENTER key.

To review the contents of memory in order to select a message for editing or sending, the operator uses either of the Vertical Scroll keys. Input from the key is recognized by controller 50, which in response causes display 32 to display the first (Up Scroll) or last (Down Scroll) label in memory. Subsequent actuations of the key cause the remaining labels to be sequentially displayed. Actuation of the ENTER key selects the labeled message.

To select a message whose label the operator knows, the operator presses the RECALL key, and then types some or all of the characters comprising the label, and presses the equals key. Controller 52 responds by scanning the contents of memory 52 looking for a match with the label characters. The first match that is found is displayed, beginning with the label characters. If this is not the desired message, the operator can scroll forward through the remaining labels until the desired message is found. Alternatively, the user can enter an additional letter of the desired label, causing controller 50 to continue its match search. Actuation of the ENTER key selects the message for editing (insertion or deletion of text, or overstrikes). When the desired message is displayed, the operator can scroll horizontally through the text as desired, in order to edit the message.

A message may be deleted from memory. When the label of the message is displayed on display 32, the operator by pressing DELETE, END, and ENTER causes the entire message to be deleted from memory 52 without being displayed and underlined character by character. Desirably, controller 50 prevents deletion of a message whose label is embedded within other messages, and displays an error icon.

Figure 11:
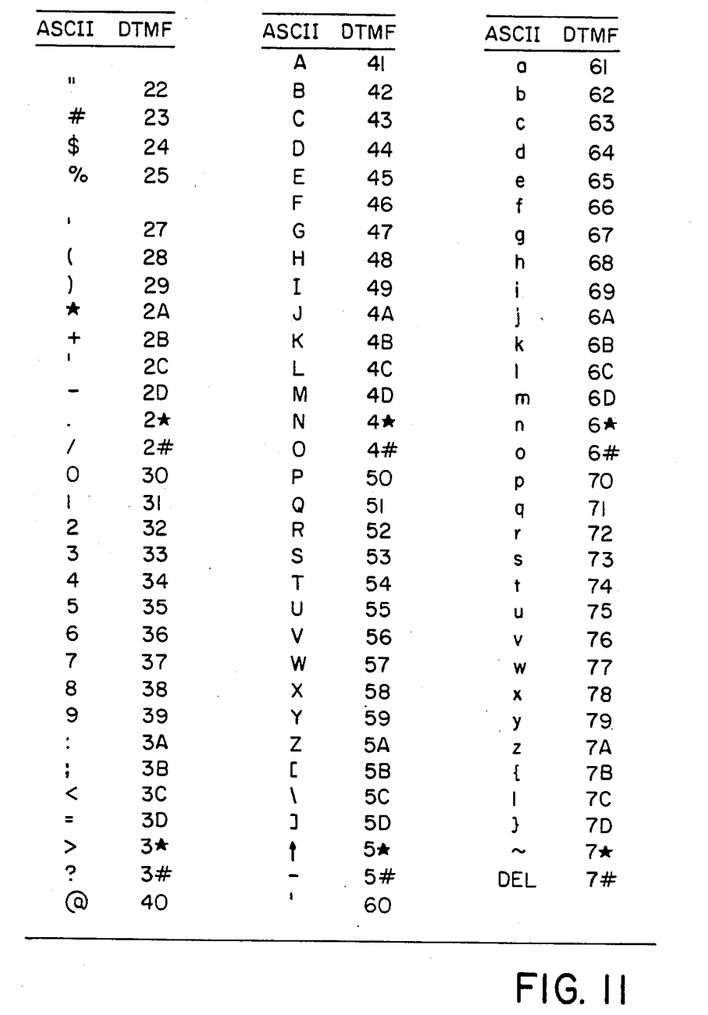
FIG. 11 displays the conversion between ASCII character codes and corresponding DTMF codes employed in the portable terminal of the invention.

Stored messages may be sent from the terminal to a host computer which can interpret the two-tone DTMF protocol displayed in FIG. 11. That is, the host must be provided with signals representing the conversion table of FIG. 11, or a conversion from the two-tone DTMF protocol to an appropriate digital encoding employed in the host. Referring now to FIG. 11, characters in the columns headed "ASCII" are characters having standard ASCII codes which may be stored in memory 52. (The ASCII codes themselves are not displayed here, being well known in the art.) In the columns headed "DTMF" are pairs of the characters for which Bell System DTMF frequency assignments are shown in FIG. 12. Thus, for example, the character "A" according to FIG. 11 is coded as the tone pair "41", or, referring to FIG. 12, (770, 1209), (697, 1209). The tone pairs are transmitted sequentially. That is, sinusoidal signals of the frequencies 770 and 1209 Hz are transmitted simultaneously to represent "4" in the standard DTMF protocol, after which sinusoidal signals of the frequencies 697 and 1209 Hz are transmitted simultaneously to represent "1" in the standard DTMF coding. Therefore, two cycles, or 200 milliseconds, are required to transmit the character "A" in this protocol, if standard Bell System timing is employed. In practice, it may be possible to transmit the tones somewhat more rapidly to the host computer.

For this purpose, referring now to FIG. 3, speaker 16 is secured to the mouthpiece 100 of transceiver 102 of telephone handset 103 by means of strap 20 or other suitable attachment means. Handset 103 is connected by an ordinary telephone line 104 to a host computer 106, which has been previously programmed to recognize and interpret the unique sequential pairs of DTMF codes. The operator in Dialer mode dials up a connection to the host 106; alternatively, a sequence of dial tones may be stored as a message in memory 52 in the manner previously described and transmitted by actuation of the SEND key. Thereafter, in Edit mode, the operator brings the label of the desired transmission into the display 32 as previously described, and then presses SEND followed by ENTER. Actuation of the SEND key automatically places the terminal in the Dialer mode, but the transmitted characters come from memory 52 rather than from keyboard 26.

Controller 50 responds to actuation of the SEND key by loading the message into a Temporary buffer 72 within memory 52, and counting the number of characters to be transmitted. A "count header" in the form of a packed decimal ASCII format number bracketed by two CD tone pairs (from FIG. 12) represents the count of characters, and is inserted ahead of the messge. The end of message is indicated by appending a DC tone pair.

Controller 50 responds to embedded telephone numbers, delimited by the codes for the NUMBER and ENTER keys, by segmenting the message. The initial count header represents the count of characters in a first message segment. Controller 50 then inserts a message end code before the telephone digits, and a further count header for the remaining text segment of the message.

Figure 9A:
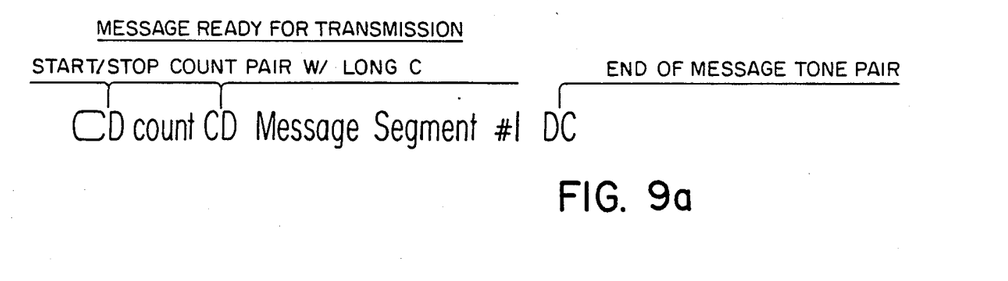
FIG. 9a shows the data string formatted for transmission by the terminal of the invention.

The entire message, formatted as described with the bracketed count header at the beginning and the DC tone pair at the end, is then read out of memory. Controller 50, referring to its stored representation of the conversion table of FIG. 11, causes tone generator 53 to generate a sequential tone pair responsive to each ASCII character code as it is read out of memory 52, according to the table of FIG. 11. The tones of the pair are applied through speaker 16 to mouthpiece 100 of handset 103 and are transmitted in the manner of other telephone signals over line 104 to host 106. Referring to FIG. 9a, in transmission the initial "C" tone is prolonged, to function as a start character. Embedded telephone numbers are recognized and are interpreted to cause generator 53 to generate standard DTMF codes according to FIG. 12 for the telephone number digits, after which additional segments of the message can be transmitted without the start character (prolonged "C" tone). If during transmission the host does not receive the number of characters indicated by the count header, an audible error message can be sent by the host, to obtain a retransmission, which must be initiated by the terminal operator.

Data from host 106 (in answer to the transmitted queries) is transmitted over telephone line 104 in audio form, desirably as compressed speech, prerecorded at the host. Synthetic speech may also be employed. The speech is audible to the user at the earphone of transceiver 102 in the usual manner.

Alternatively, a microphone (not shown) can be provided, attachable to the earpiece of tranceiver 102, and connected to controller 50. Data from host computer 106 coded as sequential DTMF tone pairs according to FIG. 11 is transmitted from host 106 to controller 50, which decodes the DTMF pairs to ASCII codes, which are stored in memory 51. Such data can then be recalled from memory in the manner previously described.

Desirably, an additional jack is provided in terminal housing 10, permitting a direct (not a telephone line) connection between memory 52 and a host computer or other device. Messages in ASCII form can be downloaded directly into memory 52, from which they can be displayed in the manner of other stored messages. A terminal can thereby be quickly and efficiently preloaded with standard messages or commands, tailored to the particular database with which the terminal will be used.

Messages can be transmitted by the terminal of the invention at a rate of about ten characters per second, assuming transmission of tone pairs at Bell Standard speed.

Several labels may be recalled from memory and linked together to create a new message. First a new label is entered, using the Store and Enter commands as previously described. Text or an existing label can be entered as the attached message. The new message may be a combination of text and linked labels, allowing a complex message to be sent.

What is claimed is:

1. A portable communications terminal comprising
   a keyboard providing alphanumeric character keys for entering alphanumeric input signals corresponding to alphanumeric characters, and a Store key and a Send key for entering corresponding input signals,
   storage means for storing digitally coded representations of characters corresponding to said alphanumeric character key input signals.
   a DTMF tone generator,
   output means connected to said generator, and
   controller means connected to said keyboard, said storage means, and said tone generator, and responsive to an input signal coresponding to actuation of said Store key for storing digitally coded representations of alphanumeric characters corresponding to subsequent alphanumeric input signals in said storage means as a stored message string,
   said controller means being thereafter responsive to an input signal corresponding to actuation of said Send Key for accessing said stored message string, and responsive to each successive digitally coded representation, for causing said generator to generate two successive DTMF tones to form a sequential pair uniquely corresponding to said corresponding alphanumeric character, for transmission by said output means,
   said controller means being further responsive to actuation of said Send key for accessing said storage means and for deriving a representation of number of characters represented in said stored message string, and thereafter for causing said generator means to generate tone pairs uniquely corresponding to a start character and to a count header representing said derived representation of number.

* * * * *